United States Patent Office 3,126,319
Patented Mar. 24, 1964

3,126,319
METHOD FOR THE POTENTIATION OF ANTI-HISTAMINES: 2 - [p - CHLORO - α(2 - DIMETHYL-AMINOETHOXY)BENZYL]PYRIDINE AND 5-(N - METHYL-4-PIPERIDYLIDENE)DIBENZO[a,e]CYCLOHEPTATRIENE
Irving Tabachnick, North Caldwell, and Franklin E. Roth, Livingston, N.J., assignors to Schering Corporation, Bloomfield, N.J., a corporation of New Jersey
No Drawing. Filed Apr. 30, 1962, Ser. No. 191,285
21 Claims. (Cl. 167—65)

This invention relates to a method of potentiating certain antihistamines, to compositions comprising of nicotinamide in admixture with a member of a small group of known antihistamine substances, and to processes for making and using such compositions.

The invention sought to be patented, in its composition aspect, is described as residing in the concept of a mixture comprising of nicotinamide and an antihistamine selected from the group consisting of chlorpheniramine (i.e., 2 - [p - chloro-α(2-dimethylamino-ethoxy)benzyl]-pyridine), dextro-chlorpheniramine and cyproheptadine (i.e., 5 - (N-methyl-4-piperidylidene)dibenzo[a,e]cycloheptatriene), said antihistamines being in admixture with the nicotinamide either in the form of its free base or in the form of a pharmaceutically acceptable acid addition salt thereof.

The invention sought to be patented, in one of its process aspects, is described as residing in the concept of using the tangible embodiments of the compositions of this invention by administering to a mammal such compositions as a pharmaceutical formulation for the application of anti-allergic therapy. Another process aspect of this invention comprises the method of potentiating the anti-allergy effect of an antihistamine of this invention by administering internally, for concurrent physiological action, nicotinamide and an antihistamine of this invention.

As used herein, the terms "certain antihistamines" or "antihistamines of this invention" mean chlorpheniramine, dextrochlorpheniramine and cyproheptadine, including their pharmaceutically acceptable acid addition salts, among which are, for purposes of illustration but without limiting the generality of the foregoing, hydrochloride, maleate, phenylsuccinate, succinate, salicylate, and malonate, or any of the other known and used acid addition salts of the antihistamines of this invention.

It is known that nicotinamide has exhibited limited antihistaminic effects, but by reason of its low potency and in view of other factors, it has never been classified as an antihistamine, nor has it ever been commercially used in formulations useful for the treatment of allergic disorders. The antihistamines of this invention, however, have been well-known to exhibit anti-allergic properties and, in general, these compounds have enjoyed considerable success. However, these compounds, like many another effective drug, do exhibit certain undersirable side-effects at their effective dosage levels and therefore their effective utility has been limited in certain instances. Additionally, certain cases of allergy disorders have heretofore been refractory to the antihistamines of this invention, as well as to any of the other known antihistamines.

Quite unexpectedly, we have discovered that combining nicotinamide with the antihistamines of this invention will increase the antihistaminic efficacy of the antihistamines so as to result in reduction and/or elimination of side-effects and to facilitate therapy for some of the heretofore refractory allergy conditions. It appears, therefore, that the novel action of the compositions of this invention will serve as valuable agents for the alleviation and control of allergy disorders.

Various well-known and accepted pharmacologic procedures were carried out to ascertain the potentiating and synergistic effects of the compositions of this invention. Three such tests are briefly described as follows:

I. Antihistaminic assay on isolated perfused guinea pig ileum: A standard Magnus-type procedure is employed utilizing a segment of ileum from a freshly killed guinea pig. The muscle strip is arranged in a 10 milliliter bath of Tyrode's solution maintained at 32° C. and constantly aerated with an oxygen/carbon dioxide mixture (95%/5%). A string-lever system attached to the free end of the gut strip permits the recording of isotonic contractions on a smoked drum. Histamine dihydrochloride (200γ/l.) is injected into the bath to induce the contractile responses. The test drugs are likewise added to the bath solution and allowed to remain there for 2 minutes before subsequent challenge with histamine is attempted. All drugs are then washed out prior to reestablishing control responses to histamine. Percent reduction of the histamine responses from those obtained prior to the addition of test drug can then be computed from quantitative measurements of the height of the contractions.

II. In vivo guinea pig anaphalaxis assay: The animals are sensitized by a single intraperitoneal injection of 0.5 milliliter of horse serum. Sixteen days later the assay is performed by challenging the animals intravenously (saphenous vein) with 1.0 milliliter of horse serum. Untreated guinea pigs die in asphyxial collapse, usually within 15 minutes. Animals in treatment groups have received a prophylactic oral dose of a test drug 1 hour prior to the intravenous challenge with antigen. Percent survival is computed only for those animals which survive for at least 30 minutes.

III. In vivo mouse anaphalaxis assay: The method used is a modification of the mouse anaphylaxis procedure employed by Malkiel (Malkiel, S. and B. J. Hargis; J. Allergy 23: 352–358, 1952), to wit: White, female, CFW mice (Carworth Farms, Swiss-Webster mice) weighing 21–23 grams are sensitized by means of the intraperitoneal administration of 0.05 milliliter of horse serum and 0.2 milliliter of pertussis vaccine (V–1035, Eli Lilly). The mice are sufficiently sensitized in 10 days. On the eleventh day, the mice are challenged with 0.2 milliliter of horse serum (intravenously) and death results within 60 minutes. Drugs are administered orally one hour before challenge, and are considered protective if they prevent death.

It is well-known to those skilled in the art that the response to antihistamines, in general, and of the antihistamines of this invention, in particular, will vary from one mammalian species to another. For example, using chlorpheniramine maleate, therapeutically effective dosage ranges in the mouse, the guinea pig, and man (expressed in milligrams of substance per kilogram of body weight) would be 0.4 to 6.4, 0.04 to 2, and 0.07 to 0.6, respectively; using dextro-chlorpheniramine maleate, the respective dosage ranges would be about 50% that amount given for chlorpheniramine maleate; and using cyproheptadine, therapeutically effective dosage ranges in the mouse and in man (expressed in milligrams of substance per kilogram of body weight) would be about 0.1 to 6.4 and 0.07 to 0.53, respectively. Therefore, in evaluating results obtained from the foregoing test procedures, with respect to the novel concepts herein described, proper considerations must be given to the specific mammal's sensitivity to the antihistamine.

From the results of the above-described test procedures, we have determined that the compositions of this invention exert a significant increase in anti-allergy effect over that which might be expected of the additive effect of the individual components of the compositions of this invention. From proper evaluations of the results of the foregoing test procedures, it is also determined that, insofar as the concepts of this invention are concerned, effective application can be achieved by administering to a mammal a preparation wherein the nicotinamide:antihistamine ratio is at least about 250 to one. In general, the more increased amounts of nicotinamide used in combination with the antihistamine, the greater will be the increase in the "potency effect" of the antihistamine.

Quite naturally, the amounts and proportion of the individual components required for each specific allergy condition depends upon the severity, the stage and the individual characteristics of each case and therefore will be determined by the attending diagnostician. As a general rule, it is desired to have from about the standard effective therapeutic dose of the selected antihistamine to about one-half of the standard dose when such is used in combination with the nicotinamide.

The method in accordance with this invention comprises the potentiation of the anti-allergy effect of an antihistamine of this invention by administering internally, for concurrent physiological action, nicotinamide, said nicotinamide being present in an amount, by weight, of at least 250 times greater than the antihistamine. It is preferred to administer the compositions of this invention orally, but in extreme circumstances it may be highly advantageous to administer intravenously.

For administration, the composition may be made up in various forms, as for example, in a tablet, in a capsule, a powder, or a liquid, such as water, for oral administration. The essential active ingredient may be extended with any desired excipient, as for example, starch. When prepared for injection the essential ingredient may be mixed with any suitable vehicle such as, for example, a physiological saline solution.

Specifically the following represents a highly effective formulation for the application of anti-allergy therapy to a 150 pound mammal, it being understood that by regulating the frequency and number of tablets taken daily, the attending diagnostician may prescribe specific therapy to suit the needs of specific cases.

*Tablet Formulation*

The following formulation provides for the manufacture of 1000 tablets:

|  | Grams |
|---|---|
| (1) Nicotinamide | 500.0 |
| (2) Chlorpheniramine maleate | 2.0 |
| (3) Lactose, USP | 80.0 |
| (4) Corn | 65.0 |
| (5) Magnesium stearate, USP | 3.0 |

Thoroughly granulate a mixture of 45 grams of corn starch, lactose, nicotinamide and chlorpheniramine maleate with a paste prepared by dissolving 20 grams of corn starch in 100 ml. of hot distilled water. Dry the resultant granulation at 40–45° C. and pass it through a No. 16 mesh screen. To the dried, screened granulation add the magnesium stearate. Thoroughly blend and compress into tablets of 650 milligrams each.

*Capsule Formulation*

The following formulation provides for the manufacture of 1000 capsules:

|  | Grams |
|---|---|
| (1) Nicotinamide | 500.0 |
| (2) Chlorpheniramine maleate | 2.0 |
| (3) Lactose, USP | 145.0 |
| (4) Magnesium stearate, USP | 3.0 |

Mix the active ingredients (1) and (2) with the lactose and blend in the magnesium stearate. Fill into hard gelatin capsules with 650 mg. each of the blended mixture.

In a similar manner effective formulations containing d-chlorpheniramine or cyproheptadine with nicotinamide may be prepared, the particular quantities of antihistamine and nicotinamide being regulated according to the precepts hereinabove stated.

We claim:

1. A pharmaceutical preparation comprising nicotinamide in admixture with an antihistamine selected from the group consisting of chlorpheniramine, d-chlorpheniramine, cyproheptadine, and the pharmaceutically acceptable acid addition salts thereof, said nicotinamide being present in an amount, by weight, of at least about 250 times greater than said antihistamine.

2. A pharmaceutical preparation comprising nicotinamide in admixture with chlorpheniramine, said nicotinamide being present in an amount, by weight, of at least about 250 times greater than said chlorpheniramine.

3. A pharmaceutical preparation comprising nicotinamide in admixture with d-chlorpheniramine, said nicotinamide being present in an amount, by weight, of at least about 250 times greater than said d-chlorpheniramine.

4. A pharmaceutical preparation comprising nicotinamide in admixture with cyproheptadine, said nicotinamide being present in an amount, by weight, of at least about 250 times greater than said cyproheptadine.

5. A pharmaceutical preparation comprising nicotinamide in admixture with a pharmaceutically acceptable acid addition salt of chlorpheniramine, said nicotinamide being present in an amount, by weight, of at least about 250 times greater than said chlorpheniramine salt.

6. A pharmaceutical preparation comprising nicotinamide in admixture with a pharmaceutically acceptable acid addition salt of d-chlorpheniramine, said nicotinamide being present in an amount, by weight, of at least about 250 times greater than said d-chlorpheniramine salt.

7. A pharmaceutical preparation comprising nicotinamide in admixture with a pharmaceutically acceptable acid addition salt of cyproheptadine, said nicotinamide being present in an amount, by weight, of at least about 250 times greater than said cyproheptadine salt.

8. The method of potentiating the anti-allergy effect of an antihistamine selected from the group consisting of chlorpheniramine, d-chlorpheniramine, cyproheptadine, and the pharmaceutical acid addition salts thereof which comprises administering internally, for concurrent physiological action, nicotinamide, said nicotinamide being present in an amount, by weight, of at least about 250 times greater than said antihistamine.

9. The method of potentiating the anti-allergy effect of chlorpheniramine which comprises administering internally, for concurrent physiological action, nicotinamide, said nicotinamide being present in an amount, by weight, of at least 250 times greater than said chlorpheniramine.

10. The method of potentiating the anti-allergy effect of d-chlorpheniramine which comprises administering internally, for concurrent physiological action, nicotinamide, said nicotinamide being present in an amount, by weight, of at least 250 times greater than said d-chlorpheniramine.

11. The method of potentiating the anti-allergy effect of cyproheptadine which comprises administering internally, for concurrent physiological action, nicotinamide, said nicotinamide being present in an amount, by weight, of at least 250 times greater than said cyproheptadine.

12. The method of potentiating the anti-allergy effect of a pharmaceutical acid addition salt of chlorpheniramine which comprises administering internally, for concurrent physiological action, nicotinamide, said nicotinamide being present in an amount, by weight, of at least 250 times greater than said chlorpheniramine salt.

13. The method of potentiating the anti-allergy effect of a pharmaceutical acid addition salt of d-chlorpheniramine which comprises administering internally, for concurrent physiological action, nicotinamide, said nicotinamide being present in an amount, by weight, of at least 250 times greater than said d-chlorpheniramine salt.

14. The method of potentiating the anti-allergy effect of a pharmaceutical acid addition salt of cyproheptadine which comprises administering internally, for concurrent physiological action, nicotinamide, said nicotinamide being present in an amount, by weight, of at least 250 times greater than said cyproheptadine salt.

15. The process for the application of anti-allergy therapy to mammals which comprises administering a pharmaceutical preparation comprising nicotinamide in admixture with an antihistamine selected from the group consisting of chlorpheniramine, d-chlorpheniramine, cyproheptadine, and the pharmaceutically acceptable acid addition salts thereof, said nicotinamide being present in an amount, by weight, of at least about 250 times greater than said antihistamine.

16. The process for the application of anti-allergy therapy to mammals which comprises administering a pharmaceutical preparation comprising nicotinamide in admixture with chlorpheniramine, said nicotinamide being present in an amount, by weight, of at least about 250 times graeter than said chlorpheniramine.

17. The process for the application of anti-allergy therapy to mammals which comprises administering a pharmaceutical preparation comprising nicotinamide in admixture with d-chlorpheniramine, said nicotinamide being present in an amount, by weight, of at least about 250 times greater than said d-chlorpheniramine.

18. The process for the application of anti-allergy therapy to mammals which comprises administering a pharmaceutical preparation comprising nicotinamide in admixture with cyproheptadine, said nicotinamide being present in an amount, by weight, of at least about 250 times greater than said cyproheptadine.

19. The process for the application of anti-allergy therapy to mammals which comprises administering a pharmaceutical preparation comprising nicotinamide in admixture with a pharmaceutically acceptable acid addition salt of chlorpheniramine, said nicotinamide being present in an amount, by weight, of at least about 250 times greater than said chlorpheniramine salt.

20. The process for the application of anti-allergy therapy to mammals which comprises administering a pharmaceutical preparation comprising nicotinamide in admixture with a pharmaceutically acceptable acid addition salt of d-chlorpheniramine, said nicotinamide being present in an amount, by weight, of at least about 250 times greater than said d-chlorpheniramine salt.

21. The process for the application of anti-allergy therapy to mammals which comprises administering a pharmaceutical preparation comprising nicotinamide in admixture with a pharmaceutically acceptable acid addition salt of cyproheptadine, said nicotinamide being present in an amount, by weight, of at least about 250 times greater than said cyproheptadine salt.

References Cited in the file of this patent

Butturini: Chem. Abst., vol. 43, page 1863i, 1949.
Stone: J. Pharm. and Exptl. Therap., vol. 131, No. 1, January 1961, page 73.
New and Nonofficial Drugs, 1962, pp. 22–23.